US009046991B2

United States Patent
Subramanian et al.

(10) Patent No.: US 9,046,991 B2
(45) Date of Patent: Jun. 2, 2015

(54) SYSTEM AND METHOD FOR DYNAMICALLY DISPLAYING STRUCTURALLY DISSIMILAR THUMBNAIL IMAGES OF AN ELECTRONIC DOCUMENT

(75) Inventors: Anbumani Subramanian, Karnataka (IN); Prasenjit Dey, Karnataka (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1404 days.

(21) Appl. No.: 12/690,934

(22) Filed: Jan. 21, 2010

(65) Prior Publication Data
US 2011/0131534 A1    Jun. 2, 2011

(30) Foreign Application Priority Data
Nov. 30, 2009 (IN) ............................ 2942/CHE/2009

(51) Int. Cl.
G06F 3/048        (2013.01)
G06F 3/0483      (2013.01)
(52) U.S. Cl.
CPC .................................... *G06F 3/0483* (2013.01)
(58) Field of Classification Search
USPC .......................................................... 715/838
See application file for complete search history.

(56) References Cited

U.S. PATENT DOCUMENTS

| | | | |
|---|---|---|---|
| 2007/0094615 A1* | 4/2007 | Endo et al. ..................... | 715/838 |
| 2007/0168856 A1* | 7/2007 | Berkner et al. ................ | 715/517 |
| 2008/0068622 A1* | 3/2008 | Deng et al. ..................... | 358/1.3 |
| 2009/0284551 A1* | 11/2009 | Stanton .......................... | 345/629 |
| 2010/0049708 A1* | 2/2010 | Kawai et al. ...................... | 707/5 |

* cited by examiner

*Primary Examiner* — Tadeese Hailu
*Assistant Examiner* — Darrin Hope
(74) *Attorney, Agent, or Firm* — Van Cott, Bagley, Cornwall & McCarthy (57) ABSTRACT

A system and method for dynamically displaying structurally dissimilar thumbnail images generated from multiple pages of an electronic document based on a display size of a display device is disclosed. In one embodiment, one or more candidate images are selected based on a generated metric for dissimilarity for each one of multiple images associated with multiple pages of an electronic document, where the metric for dissimilarity for each one of the multiple images is generated by comparing each image of the multiple images with substantially previous images of the multiple images. Then, the selected one or more candidate images are dynamically displayed as structurally dissimilar thumbnail images based on a display size of a display device.

16 Claims, 8 Drawing Sheets

SYSTEM AND METHOD FOR DYNAMICALLY DISPLAYING STRUCTURALLY DISSIMILAR THUMBNAIL IMAGES OF AN ELECTRONIC DOCUMENT

RELATED APPLICATIONS

Benefit is claimed under 35 U.S.C. 119(a)-(d) to Foreign application Serial No. 2942/CHE/2009 entitled "SYSTEM AND METHOD FOR DYNAMICALLY DISPLAYING STRUCTURALLY DISSIMILAR THUMBNAIL IMAGES OF AN ELECTRONIC DOCUMENT" by Hewlett-Packard Development Company, L.P., filed on Nov. 30, 2009, which is herein incorporated in its entirety by reference for all purposes.

BACKGROUND

Typically, when a user wants to view all the pages of an electronic document, the pages are, by default, displayed as small thumbnail images, in most document viewers and file management applications, such as Adobe Acrobat™ reader, Windows Explorer™, and so on. A thumbnail image may be a digital image usually displayed as a small size so that more than one such image can fit in a display screen of a display device.

Such displaying of the thumbnail images in small sizes of all the pages in the electronic document may not provide a quick overview to a user. Further, the user may have to look through all the thumbnail images to find structurally interesting pages, such as those of new chapters or pages with illustrations or figures to make any meaningful inference of the content presented in the electronic document. Furthermore, this process of displaying all the thumbnail images may take up valuable space on the display screen and may become a significant challenge when display size is small, as in personal devices like a mobile phone and the number of pages are large in an electronic document.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for dynamically displaying structurally dissimilar thumbnail images of an electronic document is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

In the document, the term "electronic document" refers to an electronic media content, having multiple pages and is intended to be used in either an electronic form or a printed output, such as Microsoft Word document, Portable Document Format document and the like.

Figure 1:
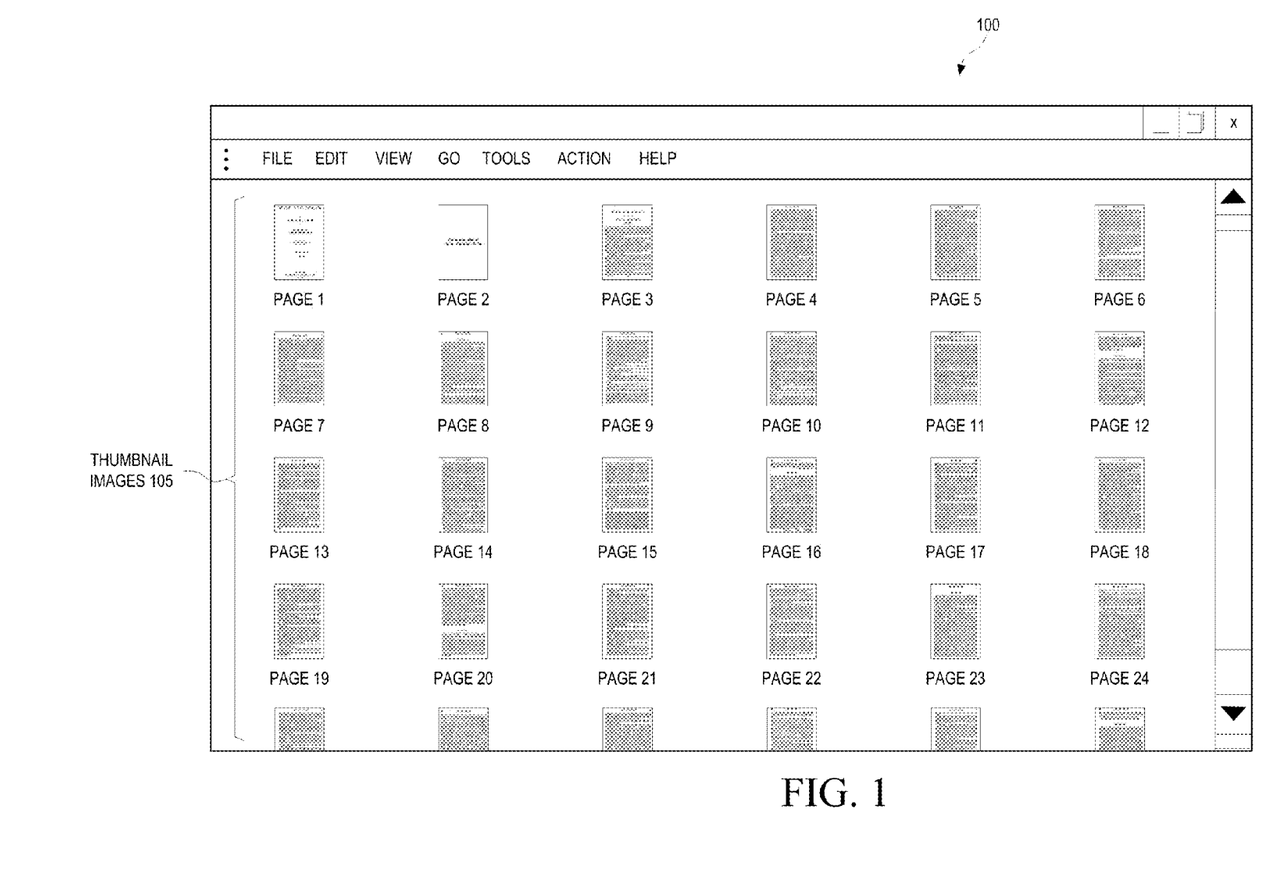
FIG. 1 illustrates a screenshot view showing thumbnail images generated from multiple pages in an electronic document displayed on a display device of a computing device, in the context of the invention.

FIG. 1 illustrates a screenshot view 100 showing thumbnail images 105 generated from multiple pages in an electronic document displayed on a display device of a computing device, in the context of the invention. In FIG. 1, the screenshot view 100 displays the thumbnail images 105 of all the multiple pages of the electronic document which allows the user to browse a collection of pages of the electronic document. A user may have to look through almost all the thumbnail images 105 to find structurally interesting pages in the electronic document, for example, a new chapter or pages with illustrations of figures. This may not facilitate the user to have a quick overview of the content of the electronic document as the thumbnail images are displayed as small images. Also, it can be seen in FIG. 1 that, the thumbnail images 105 may take up valuable space on a display screen of the display device since the thumbnail images 105 of all the multiple pages are displayed. Moreover, it can be seen in FIG. 1 that, such displaying of all the thumbnail images 105 on the display screen can make it difficult for the user to decipher the required information from the small displayed thumbnail images 105.

Figure 2:
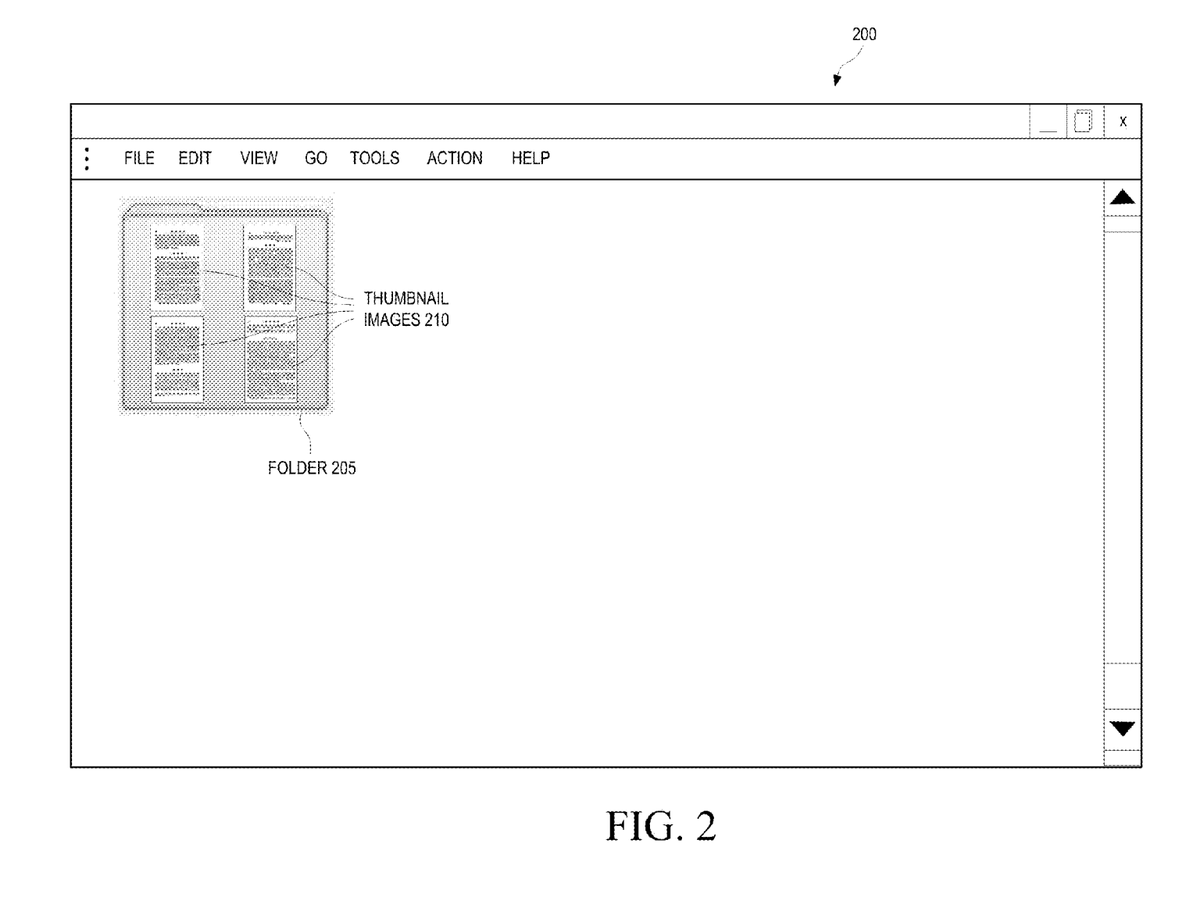
FIG. 2 illustrates a screenshot view showing a folder displaying thumbnail images of files inside the folder in the context of the invention.

FIG. 2 illustrates a screenshot view 200 showing a folder 205 displaying thumbnail images 210 of files inside the folder 205 in the context of the invention. FIG. 2 shows another way of displaying thumbnail images, in which the folder 205 displays the thumbnail images 210 of some of the files inside the folder 205. The thumbnail images 210 of some of the files inside the folder 205 may be displayed based on names of the files inside the folder 205. This may not facilitate the user to have a quick overview of all the files and its content as the folder 205 displays the thumbnail images 210 of some of the files. It can be seen in FIG. 2 that, such displaying of the thumbnail images 210 on the display screen can make it difficult for the user to decipher the required information from the small displayed thumbnail images 210.

Figure 3:
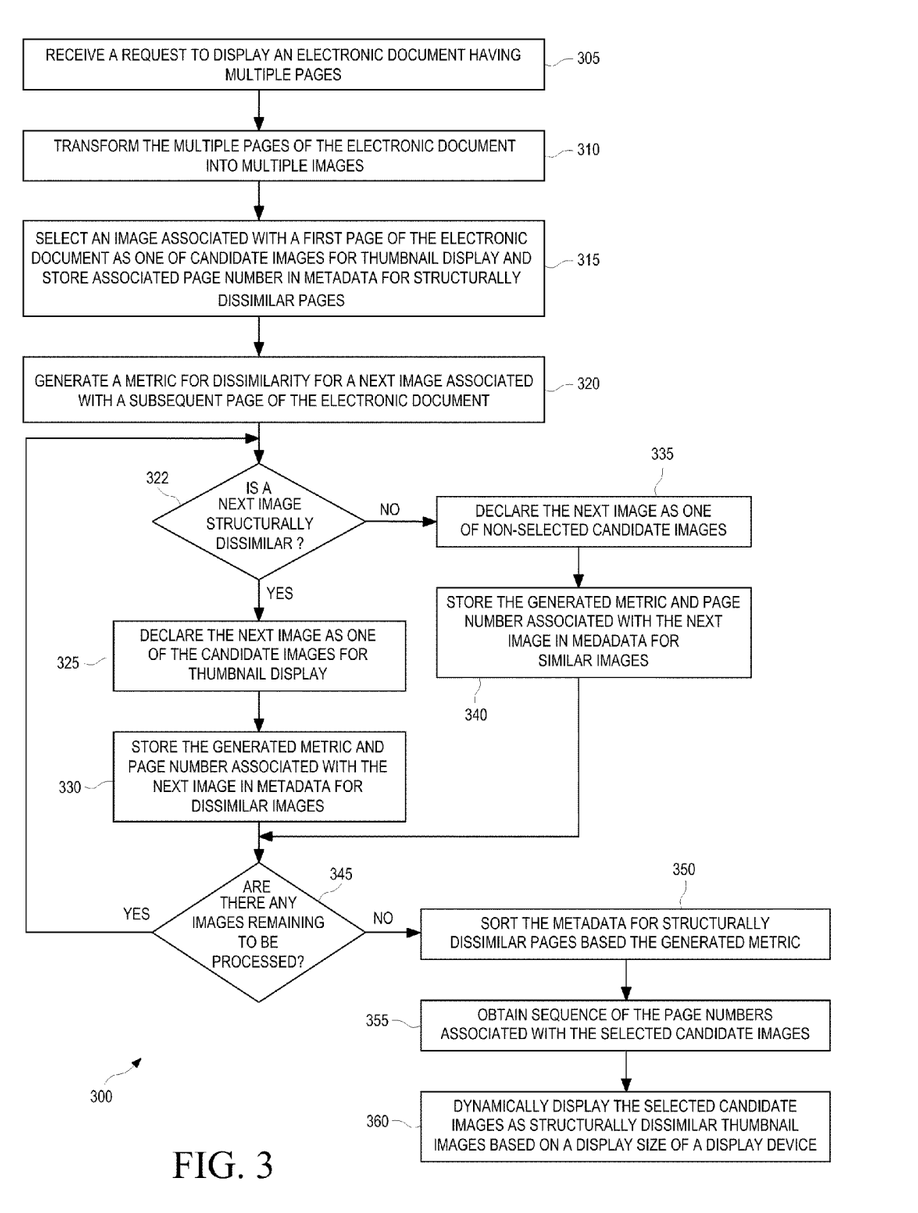
FIG. 3 illustrates a computer implemented flow diagram of an exemplary method for dynamically displaying structurally dissimilar thumbnail images generated from the multiple pages of the electronic document, according to one embodiment.

FIG. 3 illustrates a computer implemented flow diagram 300 of an exemplary method for dynamically displaying structurally dissimilar thumbnail images generated from the multiple pages of the electronic document, according to one embodiment. At step 305, a request is received from the user of a computing device, for example, a personal computer, or a mobile device such as a personal digital assistant, and the like, to display the electronic document on a display device of the computing device. For example, the request may be received via a mouse click to open a folder containing the electronic document.

At step 310, the multiple pages of the electronic document are transformed into multiple images. In one exemplary implementation, the multiple pages of the electronic document may already be transformed into multiple images before the request is received for displaying the electronic document. At step 315, an image associated with a first page of the electronic document is selected as one of candidate images for thumbnail display. Also, at step 315, a page number associated with the first page is stored in metadata for structurally dissimilar pages.

At step 320, a metric for dissimilarity for a next image associated with the subsequent page of the electronic document is generated. In one embodiment, the metric for dissimilarity for the next image may be generated by comparing the next image with a predetermined number of the candidate image(s). The predetermined number of the candidate image (s) may be determined based on a proportion of the total number of pages in the electronic document. The metric for dissimilarity for the next image generated by comparing with the predetermined number of the candidate image(s) may assist in selecting the image as a candidate image which is structurally similar to one or more of the previously selected candidate images but placed far apart in sequence.

Further, the metric for dissimilarity for the next image may be generated using image analysis techniques including but not limited to projection profiles, histogram and spatial distribution of black pixels and wavelet features. For example, in the projection profiles technique, the metric for dissimilarity for the next image may be generated by comparing horizontal and vertical projection profiles of the next image with horizontal and vertical profiles of each of the predetermined number of the candidate images. Table 1 shows an exemplary metric for dissimilarity generated for each of multiple images associated with pages of an electronic document having five pages.

TABLE 1

| PAGE NUMBER | 1 | 2 | 3 | 4 | 5 |
|---|---|---|---|---|---|
| 1 | 1 | X | X | X | X |
| 2 | 0.95 | X | X | X | X |
| 3 | 0.8 | 0.7 | X | X | X |
| 4 | 0.5 | 0.3 | 0.1 | X | X |
| 5 | X | 0.8 | 0.86 | 0.8 | X |

In the above table 1, the first column displays a page number associated with respective images associated with the pages of the electronic document, while the first row displays a page number of the images with which each image in the first column is compared to generate a metric for dissimilarity for that image. As shown in table 1, a metric for an image of a page 1 is '1' as the page 1 is a first page of the electronic document. It can be noted that, since there is no other page preceding the page 1, the metric for the image of the page 1 is '1'. Further, a metric for an image of a page 2 generated by comparing the image of the page 2 with the image of the page 1 is '0.95'. A metric for an image of a page 3 generated by comparing the image of the page 3 with the image of the page 1 is '0.8' and by comparing the image of the page 3 with the image of the page 2 is '0.7'.

A metric for an image of a page 4 generated by comparing the image of the page 4 with the image of page 1 is '0.5' and by comparing the image of the page 4 with the image of the page 2 is '0.3'. Also, a metric for the image of the page 4 generated by comparing the image of the page 4 with the image of the page 3 is '0.1'. In the above table 1, the predetermined window for comparison is three pages. Thus, as described above and as shown in the table 1, an image of a page 5 is not compared with the image of the page 1 for generating a metric for the image of the page 5 as the predetermined window of comparison is three pages. In other words, the image of the page 5 is compared with previous images of three pages, viz. the image of the page 2, the image of the page 3 and the image of the page 4 for generating the metric. The metric for the image of the page 5 generated by comparing with the image of the page 2, the image of the page 3 and the image of the page 4 is '0.8', '0.86' and '0.8', respectively.

In step 322, it is determined whether the next image is structurally dissimilar to the predetermined number of the candidate image(s). The next image is determined as a structurally dissimilar image if the generated metric for dissimilarity for the next image is greater than a threshold. Alternatively, if the generated metric for dissimilarity for the next image is equal to or below the threshold, the next image is determined as a structurally similar image. For example, from the table 1, if a threshold is 0.25, then the images associated with page numbers 1, 2, 3, and 5 are structurally dissimilar whereas the image associated with the page number 4 is determined as structurally similar.

If it is determined that the next image is structurally dissimilar, then at step 325, the next image is declared as one of the candidate images for thumbnail display. At step 330, the generated metric for dissimilarity for the next image and a page number associated with the next image are stored in the metadata for dissimilar pages. If it is determined that the next image is structurally similar, then at step 335, the next image is declared as one of non-selected candidate images. At step 340, the generated metric for dissimilarity for the next image and a page number associated with the next image are stored in metadata for similar pages.

Further, at step 345, it is determined whether there are any images in the multiple images remaining to be processed. If there are any images to be processed, then step 320 is performed. If all the images are already processed, then step 350 is performed. At step 350, the metadata for the structurally dissimilar pages is sorted based on the generated metric for dissimilarity for the candidate images. In one embodiment, the metadata for the structurally dissimilar pages may be sorted in a descending order. In another embodiment, the metadata for the structurally dissimilar pages may be sorted for all structurally dissimilar pages of the electronic document but excluding the first page of the electronic document.

At step 355, a sequence of the page numbers associated with the candidate images is obtained. It can be noted that, the first page may retain the first position in the sequence of the page numbers. At step 360, the candidate images are dynamically displayed as structurally dissimilar thumbnail images on the display device based on the sequence of the page numbers. The structurally dissimilar thumbnail images may be dynamically displayed based on a display size of the display device and/or user preference for structural dissimilarity.

Figure 4A:
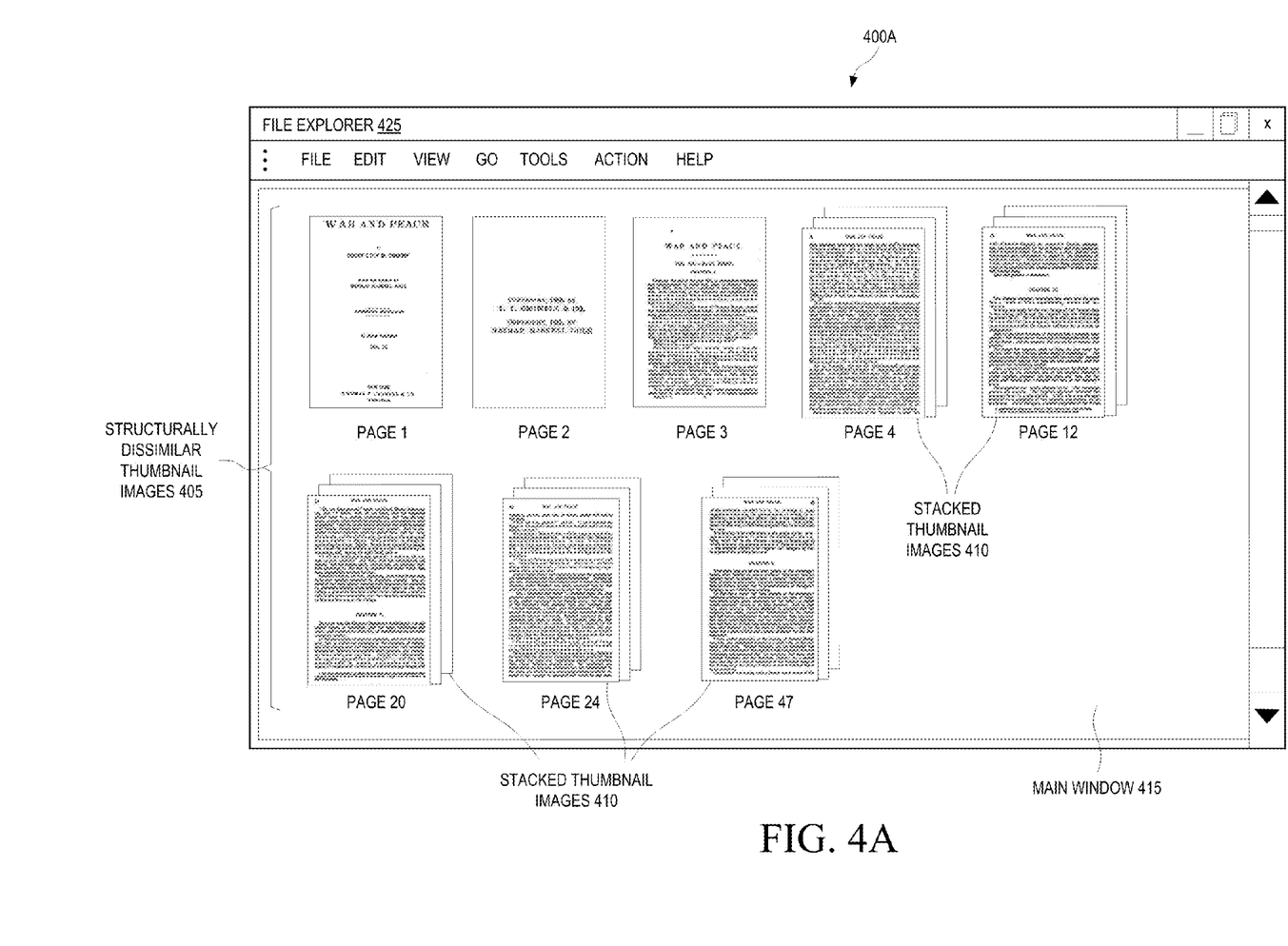
FIGS. 4A and 4B illustrate screenshot views displaying selected candidate images as structurally dissimilar thumbnail images along with associated non-selected candidate images as stacked thumbnail images, according to one embodiment.
Figure 4B:
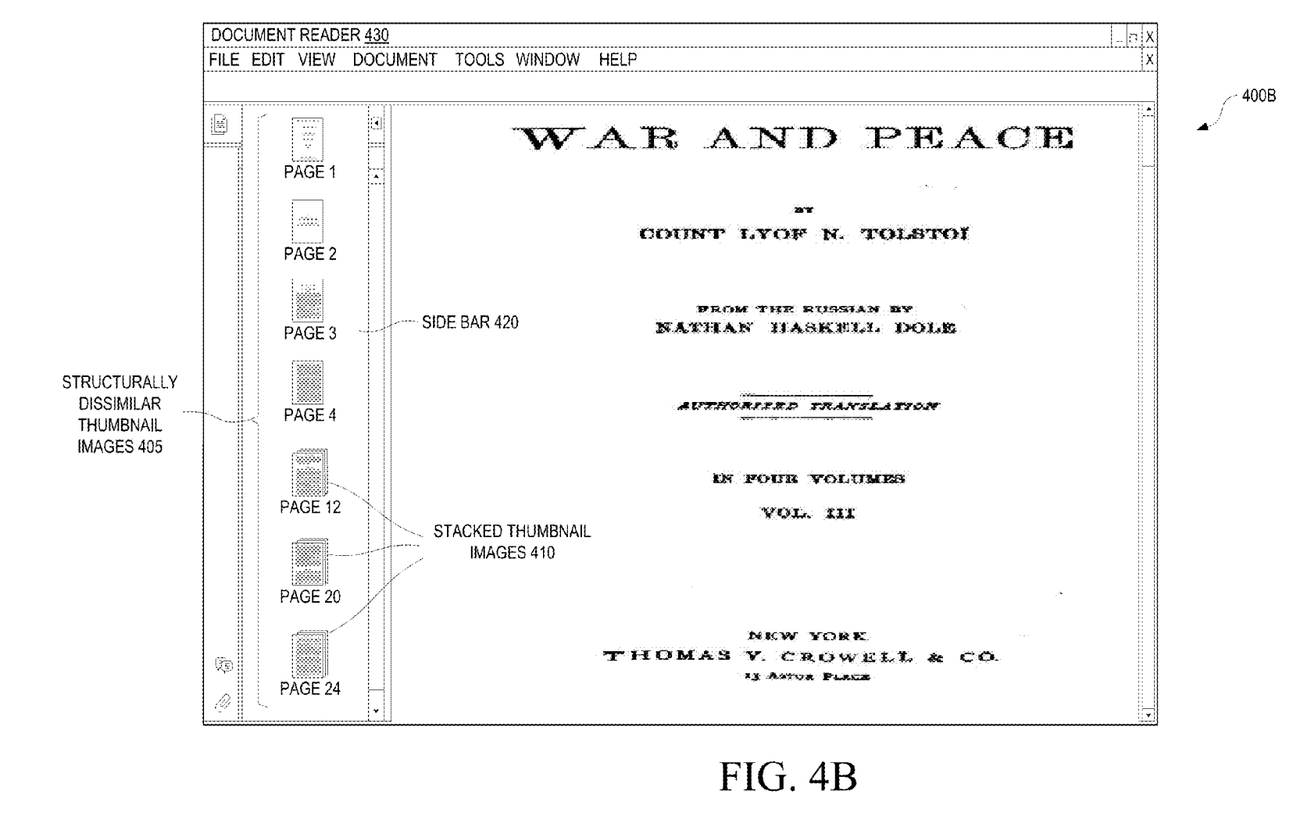
Figure 5A:
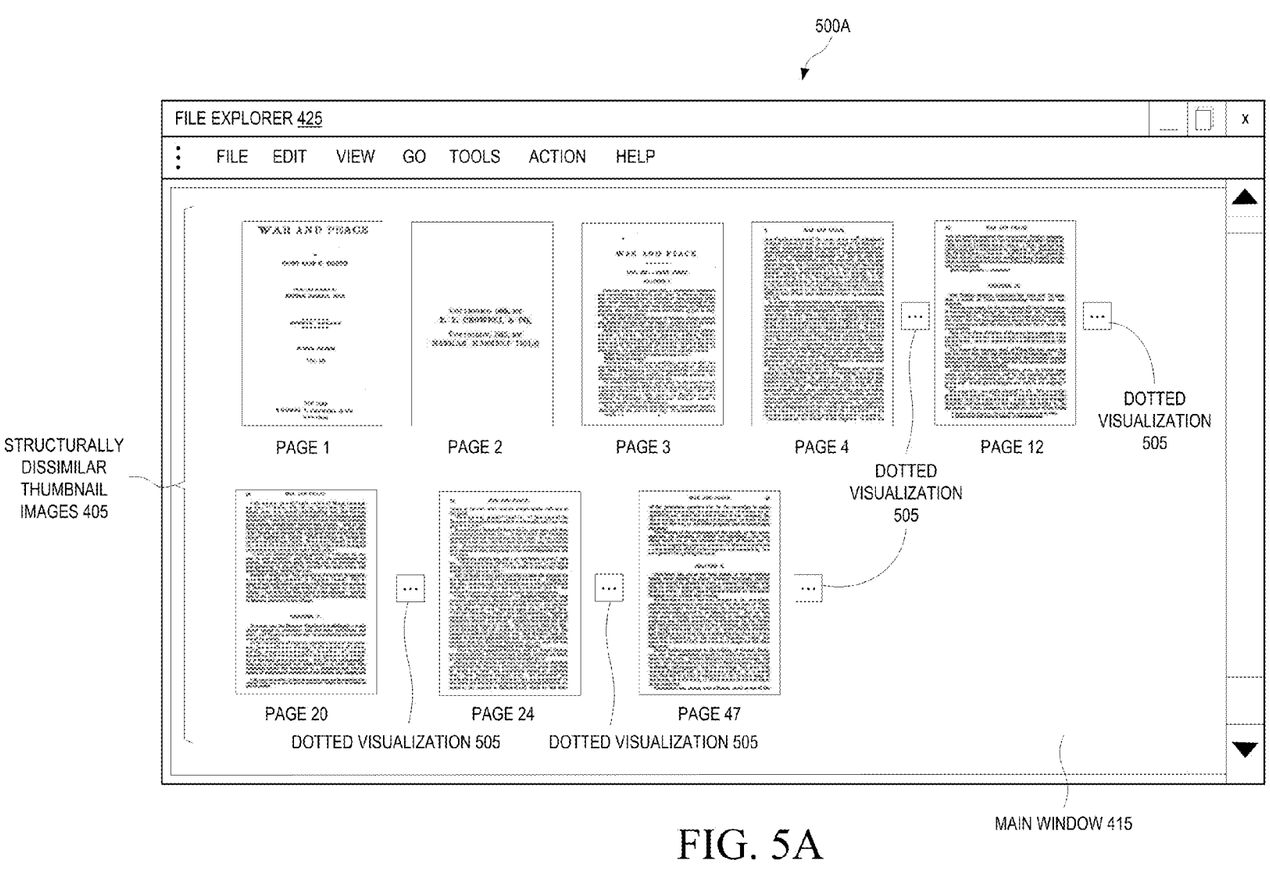
FIGS. 5A and 5B illustrate screenshot views displaying the selected candidate images as the structurally dissimilar thumbnail images along with dotted visualization of associated non-selected candidate images, according to one embodiment.
Figure 5B:
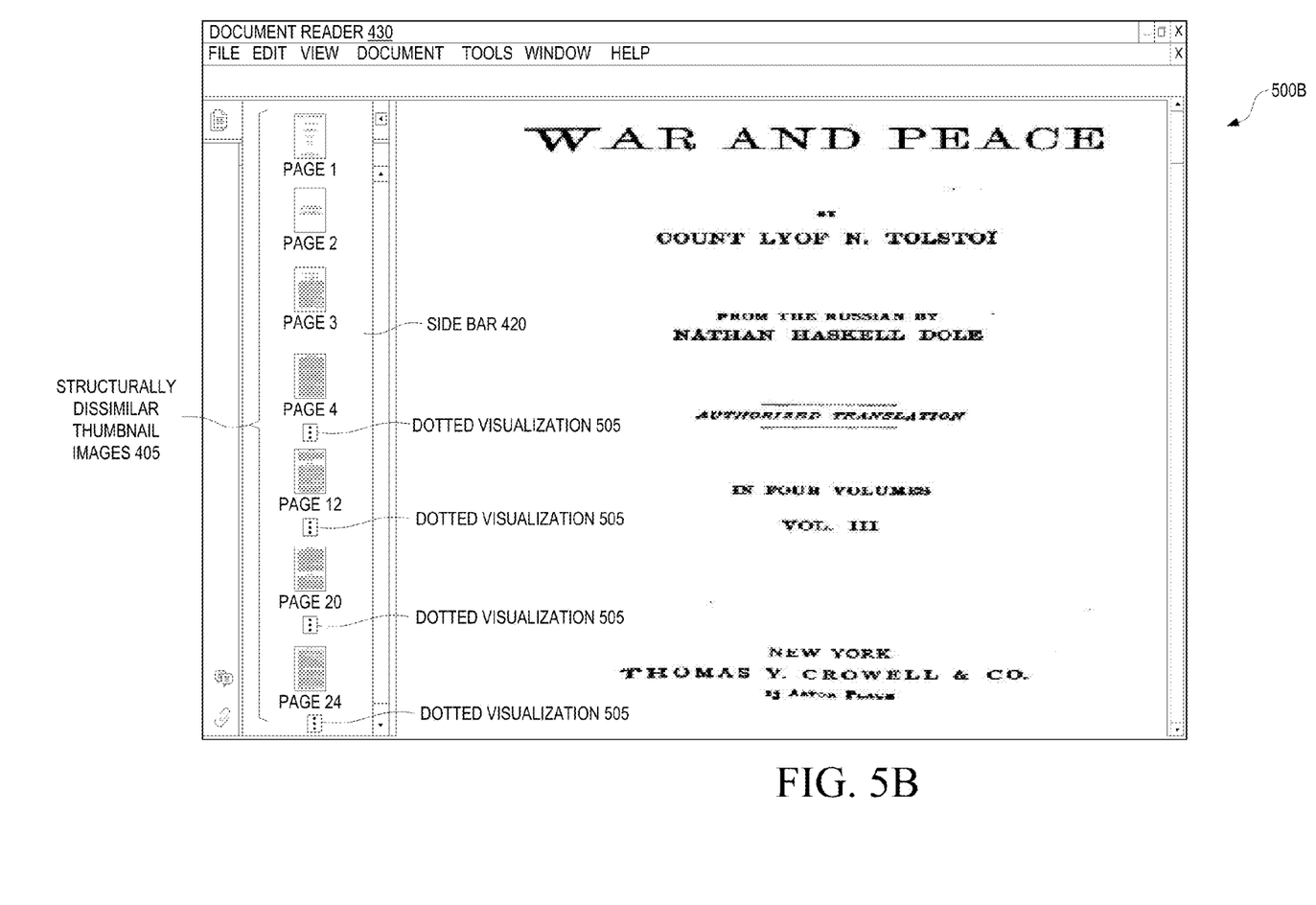

In one embodiment, the selected candidate images may be displayed as structurally dissimilar thumbnail images, along with associated non-selected candidate images as stacked thumbnail images, based on the display size of the display device, as illustrated in FIGS. 4A and 4B. In another embodiment, the selected candidate images may be displayed as the structurally dissimilar thumbnail images along with dotted visualization of associated non-selected candidate images based on the display size of the display device, as illustrated in FIGS. 5A and 5B.

FIGS. 4A and 4B illustrate screenshot views 400A and 400B displaying the selected candidate images as structurally dissimilar thumbnail images 405 along with associated non-selected candidate images as stacked thumbnail images 410, according to one embodiment. In particular, the screenshot view 400A displays the structurally dissimilar thumbnail images 405 along with associated non-selected candidate images as the stacked thumbnail images 410 in a main window 415 of a file explorer 425, such as Microsoft® Windows™ explorer. Whereas, the screenshot view 400B displays the structurally dissimilar thumbnail images 405 along with associated non-selected candidate images as the stacked thumbnail images 410 in a sidebar 420 of a document reader 430, such as Adobe Acrobat™ reader and Microsoft® word.

It can be seen from FIGS. 4A and 4B that, the screenshot views 400A and 400B display the structurally dissimilar thumbnail images 405 of the pages of the electronic document which are structurally dissimilar. The non-selected candidate images of the pages of the electronic document which are structurally similar may be displayed as the stacked thumbnail images 410 along with the associated structural dissimilar thumbnail images 405.

As an example, consider that, the electronic document includes 50 pages and thumbnail images of the electronic document have to be displayed on the display device. In such a case, the above-described computer implemented method 300 of FIG. 3 may dynamically display only the structurally dissimilar thumbnail images 405. In the example embodiment illustrated in FIGS. 4A and 4B, the screenshot views 400A and 400B display "Page 1", "Page 2", "Page 3", Page 4", "Page 12", "Page 20", "Page 24" and "Page 47" as the structurally dissimilar thumbnail images 405.

It can be seen from FIGS. 4A and 4B that, the thumbnail images "PAGE 4", "PAGE 12", "PAGE 20", "PAGE 24" AND "PAGE 47" are displayed as the stacked thumbnail images 410 as the pages 5 to 11, 13 to 19, 21 to 23, 25 to 46 and 48 to 50 are structurally similar to the pages 4, 12, 20, 24 and 47, respectively. Thus, the user can have a quick overview of the content in the electronic document by looking at the structurally dissimilar thumbnail images 405. Further, the user may be allowed to explore the pages 5 to 11, 13 to 19, 21 to 23, 25 to 46 and 48 to 50 which are structurally similar by selecting the stacked thumbnail images 410 using an input device such as trackball, keyboard, keypad, mouse, digitizer screen and stylus and the like.

FIGS. 5A and 5B illustrate screenshot views 500A and 500B displaying the selected candidate images as the structurally dissimilar thumbnail images 405 along with a dotted visualization of associated non-selected candidate images 505, according to one embodiment. In particular, the screenshot view 500A displays the structurally dissimilar thumbnail images 405 along with the dotted visualization of associated non-selected candidate images 505 in the main window 415 of the file explorer 425. Whereas, the screenshot view 500B displays the structurally dissimilar thumbnail images 405 along with the dotted visualization of associated non-selected candidate images 505, in the sidebar 420 of the document reader 430.

It can be seen from FIGS. 5A and 5B that, the screenshot views 500A and 500B display the selected candidate images as the structurally dissimilar thumbnail images 405 of the pages of the electronic document which are structurally dissimilar. The non-selected candidate images of the pages of the electronic document which are structurally similar may be displayed as the dotted visualization 505.

As an example, consider that, the electronic document is having 50 pages of which structurally dissimilar thumbnail images have to be displayed on the display device. In such a case, the above-described computer implemented method 300 of FIG. 3 may dynamically display only the structurally dissimilar thumbnail images 405. In the example embodiment illustrated in FIGS. 5A and 5B, the screenshot views 500A and 500B display "PAGE 1", "PAGE 2", "PAGE 3", PAGE 4", "PAGE 12", "PAGE 20", "PAGE 24" AND "PAGE 47" as the structurally dissimilar thumbnail images 405. The screenshot views 500A and 500B display the dotted visualization 505 representing pages 5 to 11, 13 to 19, 21 to 23, 25 to 46 and 48 to 50 which are structurally similar.

The user can have a quick overview of the content in the electronic document by looking at the structurally dissimilar thumbnail images 405. Further, the user may be allowed to explore the pages 5 to 11, 13 to 19, 21 to 23, 25 to 46 and 48 to 50 which are structurally similar by selecting the dotted visualization 505 using an input device, such as trackball, keyboard, keypad, mouse, digitizer screen and stylus and the like.

It can be seen from FIGS. 4A, 4B, 5A and 5B that the structurally dissimilar thumbnail images 405 when displayed may not take up valuable space on the display screen of the display device unlike the traditional way in which the thumbnail images of all the pages of the electronic document are displayed on the display device as shown in FIG. 1. Also, the structurally dissimilar thumbnail images 405 are displayed based on the display size of the display device. For example, if the display size is small, then the number of structurally dissimilar thumbnail images 405 displayed on the display device is less. On the contrary, if the display size is large, the number of the structurally dissimilar thumbnail images 405 displayed on the large display is more. Further, displaying of the structurally dissimilar thumbnail images 405 may assist the user to decipher required information from the structurally dissimilar thumbnail images 405.

Figure 6:
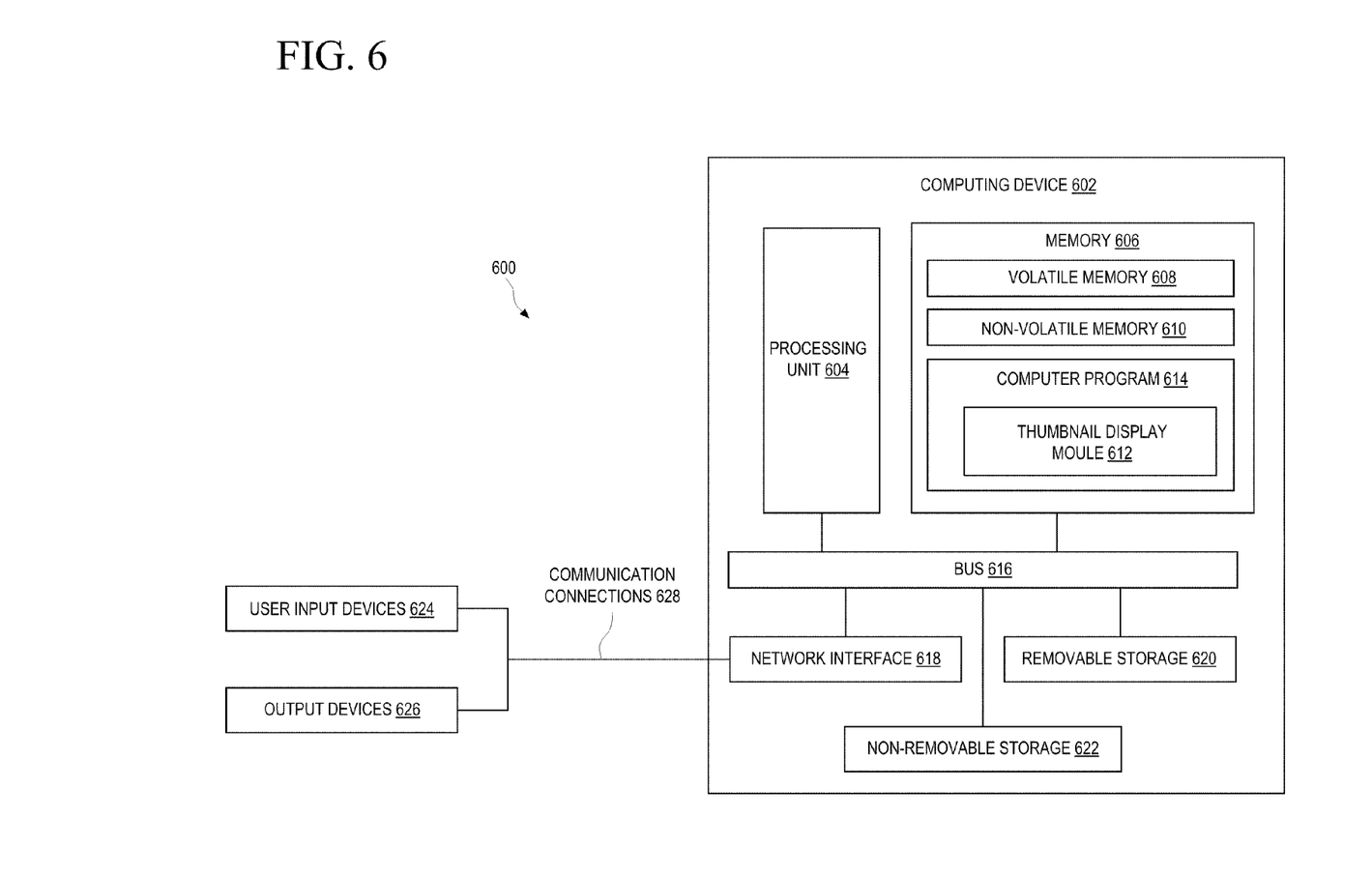
FIG. 6 shows an example of a suitable computing system environment for implementing embodiments of the present subject matter.

FIG. 6 shows an example of a suitable computing system environment 600 for implementing embodiments of the present subject matter. FIG. 6 and the following discussion are intended to provide a brief, general description of a suitable computing environment in which certain embodiments of the inventive concepts contained herein may be implemented.

A general computing device 602, in the form of a personal computer or a mobile device, may include a processing unit 604, memory 606, a removable storage 620, and a non-removable storage 622. The computing device 602 additionally includes a bus 616 and a network interface 618. The computing device 602 may include or have access to a computing environment 600 that includes one or more user input devices 624, one or more output devices 626, and one or more communication connections 628 such as a network interface card or a universal serial bus connection.

The one or more user input devices 624 may be a digitizer screen and a stylus, trackball, keyboard, keypad, mouse, and the like. The one or more output devices 626 may be a display device of the personal computer or the mobile device. The communication connection 628 may include a local area network, a wide area network, and/or other networks.

The memory 606 may include volatile memory 608 and non-volatile memory 610. A variety of computer-readable storage media may be stored in and accessed from the memory elements of the computing device 602, such as the volatile memory 608 and the non-volatile memory 610, the removable storage 620 and the non-removable storage 622. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processing unit 604, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 604 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processing unit 604 of the computing device 602. For example, a computer program 614 may include machine-readable instructions capable of dynamically displaying the structurally dissimilar thumbnail images 405 of the multiple pages of the electronic document, according to the teachings and herein described embodiments of the present subject matter. In one embodiment, the computer program 614 may be included on a compact disk-read only memory (CD-ROM) and loaded from the CD-ROM to a hard drive in the non-volatile memory 610. The machine-readable instructions may cause the computing device 602 to encode according to the various embodiments of the present subject matter.

As shown, the computer program 614 includes a thumbnail display module 612 to select candidate images based on a generated metric for dissimilarity for each one of multiple images associated with the multiple pages of the electronic document. In one example embodiment, the metric for dissimilarity for each one of the multiple images may be generated by comparing each image of the multiple images with substantially previous images of the multiple images. Further, the thumbnail display module 612 may dynamically display the selected candidate images as the structurally dissimilar thumbnail images 405 based on a display size of the display device. In one exemplary implementation, the thumbnail display module 612 may select a current image from the multiple images as one of the candidate images for thumbnail display. The thumbnail display module 612 may then determine whether a next image in the multiple images is structurally dissimilar to a predetermined number of candidate images based on a generated metric for dissimilarity.

In one example embodiment, the thumbnail display module 612 declares the next image as one of the candidate images for the thumbnail display if the generated metric for dissimilarity is greater than a threshold. In an alternate embodiment, the thumbnail display module 612 declares the next image as one of non-selected candidate images if the generated metric for dissimilarity is equal to or below the threshold. Then, the thumbnail display module 612 may determine whether there are any images in the multiple images remaining for selection as one of the candidate images for the thumbnail display. If there are images remaining, then the thumbnail display module 612 may repeat the above steps for a next image, else may end the selection process.

Further, the thumbnail display module 612 may dynamically display the selected candidate images as structurally dissimilar thumbnail images 405 along with associated non-selected candidate images as stacked thumbnail images 410 based on the display size of the display device. Alternatively, the thumbnail display module 612 may dynamically display the selected one or more candidate images as the structurally dissimilar thumbnail images 405 along with the dotted visualization of associated non-selected candidate images 505 based on the display size of the display device.

For example, the computer-readable storage medium may have instructions that, when executed by the computing device 602, cause the computing device 602 to perform a method of dynamically displaying the structurally dissimilar thumbnail images 405 generated from the multiple pages of the electronic document. The computer-readable storage medium may have instructions to select candidate images based on a generated metric for dissimilarity for each one of the multiple images associated with the multiple pages of the electronic document. In selecting the candidate images, the computer-readable storage medium may have further instructions to select a current image from the multiple images as one of the candidate images for thumbnail display.

The computer-readable storage medium may also have instructions to determine whether a next image in the multiple images is structurally dissimilar to a predetermined number of the selected candidate images based on a metric generated for dissimilarity by comparing the next image with the predetermined number of the selected candidate images. Further, the computer-readable storage medium may have instructions to declare the next image as one of the candidate images for the thumbnail display if the generated metric for dissimilarity is above a threshold. If the generated metric for dissimilarity is equal to or below the threshold, the computer-readable storage medium may have instructions to declare the next image as one of non-selected candidate images.

Also, the computer-readable storage medium may have instructions to determine whether there are any images for selecting as one of the candidate images for the thumbnail display. If there are any images, then the computer-readable storage medium may have instructions to re-execute the above instructions, else, end the selection of candidate images for the thumbnail display.

Further, the computer-readable storage medium may have instructions to dynamically display the selected candidate images as the structurally dissimilar thumbnail images 405 based on the display size of the display device. The operation of the computing device 602 for dynamically displaying the structurally dissimilar thumbnail images 405 of the multiple pages of the electronic document is explained in greater detail with reference to FIGS. 1-6.

In various embodiments, the methods and systems described in FIGS. 1 through 6 may facilitate a user to get a quick overview of content of an electronic document from thumbnail display of structurally dissimilar pages of the electronic document. Also, the above-described systems and methods may display the structurally dissimilar thumbnail images based on a display size of a display device. Also, the above-described systems and methods may not require manual tagging of the pages of the electronic document and may substantially reduce cost associated with the manual tagging. Although, the above-description of the methods and the systems is made with reference to the electronic document, one can envision that structurally dissimilar thumbnail images of pages of a scanned document can also be dynamically displayed using the methods and systems described above.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A computer implemented method for dynamically displaying structurally dissimilar thumbnail images, comprising:
    selecting one or more candidate images based on a generated metric for dissimilarity for each one of multiple images generated from multiple pages of a single electronic document, wherein the metric for dissimilarity for each one of the multiple images is generated by comparing each image of the multiple images with substantially previous images of the multiple images; and
    dynamically displaying the selected one or more candidate images as structurally dissimilar thumbnail images based on a display size of a display device.

2. The method of claim 1, wherein selecting the one or more candidate images based on the generated metric for dissimilarity for each one of the multiple images generated from the multiple pages of the electronic document comprises:
    selecting a current image from the multiple images as one of candidate images for thumbnail display;
    determining whether a next image in the multiple images is structurally dissimilar to the selected candidate images based on the metric for dissimilarity generated by comparing the next image with the selected candidate images;
    if the generated metric for dissimilarity is above a threshold, then declaring the next image as one of the candidate images for the thumbnail display; and
    if the generated metric for dissimilarity is equal to or below the threshold, then declaring the next image as one of non-selected candidate images.

3. The method of claim 2, further comprising:
    determining whether there are any images in the multiple images remaining for selecting as one of the candidate images for the thumbnail display;
    if so, repeating the above steps of determining and declaring for each of the remaining images; and
    if not, ending the selection of the candidate images for the thumbnail display.

4. The method of claim 1, wherein selecting the one or more candidate images based on the generated metric for dissimilarity for each one of the multiple images generated from the multiple pages of the electronic document comprises:
    selecting a current image from the multiple images as one of candidate images for thumbnail display;
    determining whether a next image in the multiple images is structurally dissimilar to a predetermined number of the selected candidate images based on a metric for dissimilarity generated by comparing the next image with the predetermined number of the selected candidate images;
    if the generated metric for dissimilarity is above a threshold, then declaring the next image as one of the candidate images for thumbnail display;
    if the generated metric for dissimilarity is equal to or below the threshold, then declaring the current image as one of non-selected candidate images;
    determining whether there are any images in the multiple images remaining for selecting as one of the candidate images for the thumbnail display;
    if so, repeating the steps of determining, declaring and determining; and
    if not, ending the selection of the one or more candidate images for the thumbnail display.

5. The method of claim 1, in which dynamically displaying the selected one or more candidate images as the structurally dissimilar thumbnail images based on the display size of the display device comprises:
    dynamically displaying the selected candidate images as the structurally dissimilar thumbnail images along with associated non-selected candidate images as stacked thumbnail images based on the display size of the display device.

6. The method of claim 1, in which dynamically displaying the selected one or more candidate images as the structurally dissimilar thumbnail images based on the display size of the display device comprises:
    dynamically displaying the selected one or more candidate images as the structurally dissimilar thumbnail images along with dotted visualization of associated non-selected candidate images based on the display size of the display device.

7. The method of claim 1, further comprising:
    receiving a request to display the electronic document including the multiple pages; and
    transforming the multiple pages into the multiple images.

8. The method of claim 1, wherein selecting the one or more candidate images based on the generated metric for dissimilarity for each one of the multiple images generated from the multiple pages of the electronic document, comprises:
    storing metadata including generated metric for dissimilarity and associated page numbers; and
    selecting the one or more candidate images based on the stored metadata.

9. The method of claim 1, wherein, in determining whether the next image in the multiple images is structurally dissimilar, the metric for dissimilarity is generated using image analysis techniques selected from the group consisting of projection profiles, histogram and spatial distribution of black pixels, and wavelet features.

10. The method of claim 1, in which the substantially previous images are a number of images generated from corresponding previous pages within the multiple pages of the electronic document.

11. A non-transitory computer-readable storage medium having instructions that, when executed by a computing device, causes the computing device to perform a method of dynamically displaying structurally dissimilar thumbnail images, comprising:

selecting one or more candidate images based on a generated metric for dissimilarity for each one of multiple images generated from multiple pages of a single electronic document, wherein the metric for dissimilarity for each one of the multiple images is generated by comparing each image of the multiple images with substantially previous images of the multiple images; and dynamically displaying the one or more candidate images as structurally similar thumbnail images based on a display size of a display device.

12. The non-transitory computer-readable storage medium of claim 11, wherein selecting the one or more candidate images based on the generated metric for dissimilarity for each one of the multiple images generated from the multiple pages of the electronic document comprises:

selecting a current image from the multiple images as one of the candidate images for thumbnail display;

determining whether a next image in the multiple images is structurally dissimilar to a predetermined number of the selected images based on a metric for dissimilarity generated by comparing the next image with the predetermined number of the selected candidate images;

if the generated metric for dissimilarity is above a threshold, then declaring the next image as one of the candidate images for the thumbnail display;

if the generated metric for dissimilarity is equal to or below the threshold, then declaring the next image as one of non-selected candidate images;

determining whether there are any images for selecting as one of the candidate images for the thumbnail display;

if so, repeating the steps of determining, declaring and determining; and if not, ending the selection of the candidate images for the thumbnail display.

13. A system for dynamically displaying structurally dissimilar thumbnails, comprising:

a display device;

a processor; and memory coupled to the processor, wherein the memory includes a thumbnail display module, and wherein the thumbnail display module selects one or more candidate images based on a generated metric for dissimilarity for each one of multiple images generated from multiple pages of a single electronic document, and wherein the metric for dissimilarity for each one of the multiple images is generated by comparing each image of the multiple images with substantially previous images of the multiple images, and wherein the thumbnail display module dynamically displays the one or more candidate images as structurally dissimilar thumbnail images based on a display size of a display device.

14. The system of claim 13, wherein thumbnail display module selects a current image from the multiple images as one of candidate images for thumbnail display, and wherein the thumbnail display module determines whether a next image in the multiple images is structurally dissimilar to a predetermined number of the selected candidate images based on a metric for dissimilarity generated by comparing the next image with the predetermined number of the selected candidate images, and wherein the thumbnail display module declares the next image as one of the candidate images for the thumbnail display if the generated metric for dissimilarity is above a threshold, and wherein the thumbnail display module declares the next image as one of non-selected candidate images if the generated metric for dissimilarity is equal to or below the threshold, and wherein the thumbnail display module determines whether there are any images in the multiple images remaining for selecting as one of the candidate images for the thumbnail display, and wherein the thumbnail display module repeats the steps of determining, declaring and determining if there are any images remaining for selection, and wherein the thumbnail display module ends the selection of the candidate images for the thumbnail display if there are no images remaining for selection.

15. The system of claim 13, wherein the thumbnail display module dynamically displays the selected one or more candidate images as the structurally dissimilar thumbnail images along with associated non-selected candidate images as stacked thumbnail images based on the display size of the display device.

16. The system of claim 13, wherein the thumbnail display module dynamically displays the selected one or more candidate images as the structurally dissimilar thumbnail images along with dotted visualization of associated non-selected candidate images based on the display size of the display device.

* * * * *